United States Patent [19]

Knapp

[11] Patent Number: 4,596,376

[45] Date of Patent: Jun. 24, 1986

[54] MIXER VALVE WITH HARD MATERIAL PLAQUES, PROVIDED WITH PRETHROTTLING MEANS

[75] Inventor: Alfons Knapp, Biberach an der Riss, Fed. Rep. of Germany

[73] Assignee: Gevipi A.G., Vaduz, Liechtenstein

[21] Appl. No.: 725,132

[22] Filed: Apr. 18, 1985

[30] Foreign Application Priority Data

May 9, 1984 [IT] Italy ................................ 67465 A/84

[51] Int. Cl.[4] ...................... F16K 47/02; F16K 11/06
[52] U.S. Cl. ................. 251/127; 137/625.17; 137/625.4; 251/118
[58] Field of Search ........... 137/625.17, 625.4, 625.41; 251/118, 127

[56] References Cited

U.S. PATENT DOCUMENTS

| | | | |
|---|---|---|---|
| 3,965,935 | 6/1976 | Morisseau | 137/625.4 |
| 4,218,041 | 8/1980 | Bernat | 251/127 |
| 4,301,836 | 11/1981 | Hunziker | 251/118 |
| 4,325,403 | 4/1982 | Uhlmann | 137/315 |

FOREIGN PATENT DOCUMENTS

| | | | |
|---|---|---|---|
| 1159745 | 1/1984 | Canada | 137/625.4 |
| 0059697 | 9/1982 | European Pat. Off. | 137/625.4 |
| 2937475 | 4/1981 | Fed. Rep. of Germany | 137/625.4 |
| 3131916 | 3/1982 | Fed. Rep. of Germany | 137/625.4 |

*Primary Examiner*—Alan Cohan
*Assistant Examiner*—John A. Rivell
*Attorney, Agent, or Firm*—Young & Thompson

[57] ABSTRACT

A mixer valve in which a fixed hard material plaque has passage openings which communicate with two feeding pipes, a plastic material control slide is connected to a valve operator, and a movable hard material plaque, rigidly connected to the control slide, cooperates through a portion of its peripheral edge with the passage openings of the fixed plaque, in order to control the delivered liquid flow rate and the mixing ratio of the liquids fed to the valve; the plastic material slide has a series of blades disposed in a comb-like fashion, which extend up to the vicinity of that edge portion of the movable plaque, and at least a part of which corresponds, on the side which is axially opposite the fixed plaque, to a window communicating with the space situated behind the control slide. Preferably, the control slide is guided for a diametrical displacement in a rotary guide ring, and this guide ring in its turn is provided with a series of blades disposed in register with the blades of the control slide. Thanks to these features the noise produced by the mixer valve is highly reduced.

3 Claims, 6 Drawing Figures

MIXER VALVE WITH HARD MATERIAL PLAQUES, PROVIDED WITH PRETHROTTLING MEANS

BACKGROUND OF THE INVENTION

This invention relates to a mixer valve comprising a fixed hard material plaque having passage openings communicating with two liquid feeding pipes, control means, a plastic material slide connected to said control means, and at least one movable hard material plaque which is rigidly connected to said control slide and cooperates through a portion of its peripheral edge with the passage openings of said fixed plaque in order to control the delivered liquid flow rate and the mixing ratio of the two liquids fed to the valve.

Such mixer valves are widely employed for household and sanitary appliances, for the delivery of mixed hot and cold water coming from respective feeding pipes. In some cases, these mixer valves have the particular disadvantage of producing a noise, which arises when the passage of one of the incoming liquids is highly throttled. In these conditions, in fact, the throttled flow reaches a high speed and a high turbulence, which give rise to vibrations both directly and because of the impact of the flow against surfaces of the valve. On the other hand, the configuration of the valves of the referred type does not allow a useful installation of prethrottling means of one of the already known types which are employed in other types of valves in order to solve similar problems.

BRIEF SUMMARY OF THE INVENTION

An object of this invention is to provide particular configurations capable of reducing or eliminating the noise of a valve of the referred type, by providing a prethrottling member capable of braking the flow and dampening its vibrations when the valve is in throttle conditions, without appreciably affecting the behaviour of the valve in the conditions of delivery of unthrottled flows.

Another object of the invention is to provide configurations having the purpose mentioned hereinabove, which may be industrially manufactured without a noticeable increase in the production cost.

These objects are attained, according to this invention, by a mixer valve of the referred type, characterized in that the plastic material slide has a series of blades disposed in a comb-like fashion, extending up to the vicinity of that edge portion of the movable plaque which cooperates with the openings of the fixed plaque, and at least a part of which corresponds, on the side axially opposite said fixed plaque, to a window which communicates with the space situated behind the control slide.

In addition, preferably, said blades terminate with a rounded shape at the portion radially opposite said edge of the movable plaque.

Thanks to these characteristics, the comb-like blades of the control slide take a position in register with the free portion, left uncovered by the movable plaque, of the corresponding opening of the fixed plaque, and when the flow traversing said opening is throttled, said blades sub-divide and effectively brake said flow, thus dampening its vibrations, by acting as prethrottling members. At the same time, thanks to the presence of the window communicating with the space of the valve situated behind the control slide, it is avoided the generation of counterpressures, which would hinder an effective dampening. On the other hand, when the corresponding opening of the fixed plaque is left uncovered by the movable plaque on an important portion thereof, the presence of said comb-like blades of the control slide becomes negligible, and the flow rate of liquid delivered by the valve is not noticeably reduced by said blades. This latter characteristic is obtained to a particularly considerable degree thanks to the presence of the rounded portion of said comb-like blades, which in addition ensures a particular graduality of their action at the increase of the flow throttling, and effectively contributes to rendering the flow noiseless.

Since the control slide is generally made of injection molded plastics, said series of blades may be formed on the slide with a minimum increase of its production cost.

Preferably, said control slide is guided for diametrical displacement within a rotary guide ring, and said ring in its turn is provided with a series of blades disposed in register with the blades of the control slide.

Thanks to this characteristic, a further reduction of the noise is obtained by dampening the impacts that the flow undergoes when coming out from the spaces situated between the blades of the control slide. Also the guide ring is usually made of injection molded plastics, and accordingly the provision of said series of blades on this ring does not give rise but to a minimum increase of the production costs.

BRIEF DESCRIPTION OF THE DRAWING

These and other characteristics of the subject matter of the invention, as well as its advantages, will be more clearly apparent from the following description of an embodiment, given by way of a non limiting example and diagrammatically shown in the accompanying drawing, wherein.

DETAILED DESCRIPTION OF THE PREFERRED EMBODIMENT

Figure 1:
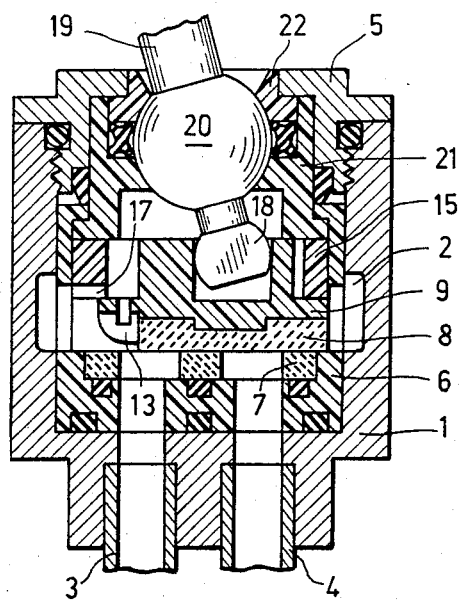
FIG. 1 shows an axial cross-section of a mixer valve embodying the invention.

Referring firstly to FIG. 1, a mixer valve of the type referred to, which in the embodiment of the present example is provided with an interchangeable cartridge, comprises a hollow body 1 having, connected thereto, the ends of two pipes 3 and 4 for feeding hot and cold water, respectively. The body 1 is further provided with an annular chamber 2 communicating with a delivery union (not shown); the body 1 is closed by a cover 5, which in the present case is screwed into the body 1.

Into the cavity of the body 1 there is interchangeably introduced a cartridge, retained by the cover 5 and containing the mechanisms of the valve. The cartridge is formed by an envelope 6 in which a hard material fixed plaque 7 is housed, which has two passages communicating with the pipes 3 and 4, respectively. Contacting the fixed plaque 7 there is a movable hard material plaque 8. The movable plaque 8 has no passage openings, since the valve is of the type in which the movable plaque 8 cooperates by a portion of its peripheral edge with the passage openings of the fixed plaque 7 in order to control the delivered flow rate of liquid and the mixing ratio of the two liquids fed to the valve through the pipes 3 and 4. The movable plaque 8 is rigidly connected to a control slide 9, by means of keying a tongue 10 of the slide into a square seating of the plaque, according to the example shown. By means of a protrusion 11 provided thereon, the control slide 9 is guided in a diametrical slot 16 of a guide ring 15, rotatably mounted within the envelope 6 of the cartridge. The protrusion 11 of the slide 9 has a flat recess 12 wherein engages a key 18 forming the second arm of a control lever 19 having as a fulcrum a ball 20. This ball is received between an inner half bearing 21 and an outer half bearing 22, which are retained by the cover 5. The guide ring 15 rests against the inner surface of the inner half bearing 21, thus discharging onto the cover 5 the pressures exerted thereon by the movable parts of the valve. Disposed between the cited components in the suitable locations there are sealing gaskets, not provided with reference numerals.

The parts described so far do not substantially differ from the known structure of the mixer valves referred to.

Figure 3:
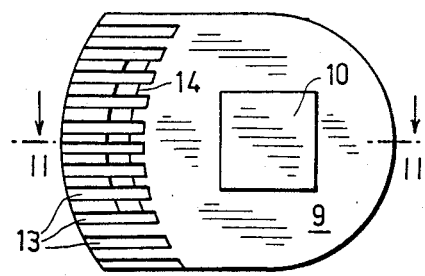
FIGS. 3 and 4 are plan views of the control slide, as seen from the side of the movable plaque and from the opposite side, respectively.
Figure 2:
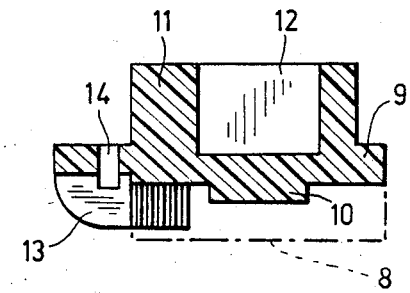
FIG. 2 shows on an enlarged scale a cross-section of the control slide alone.
Figure 6:
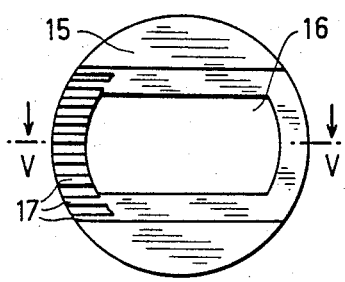
FIG. 6 is a view of said guide ring, as seen from the side of the control slide.
Figure 5:
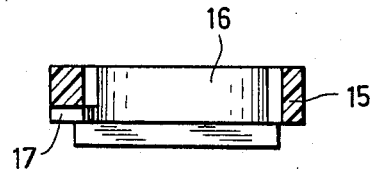
FIG. 5 is a cross-sectional view of the guide ring of the control slide, shown alone.
Figure 4:
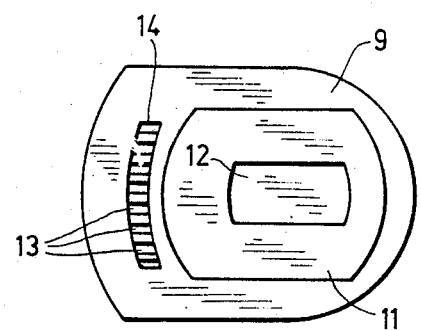

According to this invention, the control slide 9 is provided, on the face turned towards the movable plaque 8, with a series of parallel blades arranged in a comb-like fashion, as is particularly apparent from FIG. 3. These blades extend substantially up to the contact with the peripheral surface of the movable plaque 8, and their height is such as to reach nearly the level of the active surface of the plaque 8, as shown in FIG. 2, or even just the level of said surface. However, the portion of slide 9 from which the blades 3 extend is traversed by a window 14 directed towards the valve space which is situated behind the slide. Finally, the blades 13 gradually decrease in height following a curved line, at their end which is radially most remote from the movable plaque 8.

As can be seen from FIG. 1, when the movable plaque 8 is in such a position as the throttle one of the passage openings of the fixed plaque 7 (in the example shown, the left hand one, which communicates with the pipe 3), the blades 13, by acting as prethrottling members, assume such a position as to partially close said opening, and the flow coming out therefrom is compelled to subdivide in the spaces between the blades 13, which thus brake the flow and dampen its turbulence. Such a subdivision of the flow tends to generate counterpressures, which, however, discharge through the window 14 of the slide 9. Thus, the throttled flow comes out between the blades 13 in laminar and slackened condition and its flows without noise toward the annular delivery chamber 2.

Of course, when, on the contrary, the corresponding passage opening of the fixed plaque 7 is little throttle by the movable plaque 8, the presence of the blades 13 becomes negligible as regards the operation of the valve. The curvature of the ends of the blades 13 ensures a gradual insertion thereof into the flow, when the throttling of the respective passage opening is increasing, and in addition significantly contributes to the noiselessness of the valve.

The suface of the guide ring 15 which is turned towards the slide 9, at the location where the blades 13 are disposed, is preferably also provided with blades 17. In this way, a rigid impact of the liquid flowing out between the blade 13 of the control slide 9 against the surface of the guide ring is avoided, and thus another minor source of noise of the valve is eliminated.

Usually, both the slide 9 and the guide ring 15 are made of injection molded plastics. The addition to their usual configuration of the blades 13 and 17, respectively, as well as that of the window 14 of slide 9, requires only a corresponding design and working of the mold, and does not determine any significant increase in the production cost of these components.

It is pointed out that, from a merely operative point of view, the series of blades 13 and 17 could be replaced by inserting corresponding elements made of a metallic net. However, such replacement would not be desirable, on one hand because it would detrimentally affect the cost of the components and their assembly, and on the other hand because of the easiness with which a metallic net can be obstructed by impurities transported by the flow.

Of course, the specific shape of the components of the valve does not affect the application of this invention, and may therefore be generally whatever is desired. The valve may be a cartridge type valve or a valve of the type in which the components are directly assembled into the body, and its actuating means may be of any known type. Also various may be the shapes of the passage openings of the fixed plaque 7 and of the outline of the movable plaque 8.

I claim:

1. A mixer valve comprising two liquid feeding pipes, a fixed hard material plaque, passage openings in said fixed plaque communicating with said feeding pipes, control means, a plastic material slide connected to said control means, at least one movable hard material plaque rigidly connected to said slide and cooperating through a portion of its peripheral edge with the passage openings of said fixed plaque in order to control the delivered liquid flow rate and the mixing ratio of the two liquids fed to the valve, a window in said slide communicating with a space behind said slide, and a series of blades disposed in a comb-like fashion on said plastic material slide, said blades extending up to the vicinity of that edge portion of said movable plaque which cooperates with the openings of the fixed plaque, and a least a part of said blades registering, on the side of the blades axially opposite said fixed plaque, with said window of the slide.

2. A mixer valve as set forth in claim 1, wherein said blades terminate with a rounded shape at the portion radially opposite said edge of the movable plaque.

3. A mixer valve as set forth in claim 1, further comprising a rotary guide ring, said slide being guided for a diametrical displacement in said rotary guide ring, and said guide ring having a series of blades disposed in a fluid flow path from said space to an annular outlet chamber.

* * * * *